(12) United States Patent
Bock et al.

(10) Patent No.: US 9,684,132 B2
(45) Date of Patent: Jun. 20, 2017

(54) OPTICAL SLIP RING ARRANGEMENT

(71) Applicant: LEONI KABEL HOLDING GMBH, Nuremberg (DE)

(72) Inventors: Marco Bock, Lauscha (DE); Edgar Heinz, Neustadt (DE); Stefan Kufner, Sonnefeld (DE)

(73) Assignee: LEONI Kabel Holding GmbH, Nuremberg (DE)

( * ) Notice: Subject to any disclaimer, the term of this patent is extended or adjusted under 35 U.S.C. 154(b) by 0 days.

(21) Appl. No.: 15/153,954

(22) Filed: May 13, 2016

(65) Prior Publication Data
US 2016/0252680 A1    Sep. 1, 2016

Related U.S. Application Data

(63) Continuation of application No. PCT/EP2014/074082, filed on Nov. 7, 2014.

(30) Foreign Application Priority Data

Nov. 13, 2013  (DE) .................... 10 2013 223 153

(51) Int. Cl.
| | | |
|---|---|---|
| *G02B 6/12* | (2006.01) | |
| *G02B 6/36* | (2006.01) | |
| *G02B 6/30* | (2006.01) | |

(52) U.S. Cl.
CPC ............. *G02B 6/3604* (2013.01); *G02B 6/30* (2013.01)

(58) Field of Classification Search
CPC .................................................. G02B 6/3604
See application file for complete search history.

(56) References Cited

U.S. PATENT DOCUMENTS

| | | |
|---|---|---|
| 4,786,131 A | 11/1988 | Mahapatra et al. |
| 4,953,932 A | 9/1990 | Mihich |
| 5,013,311 A | 5/1991 | Nouri |
| 6,865,332 B1 * | 3/2005 | Saravanos ............ G02B 6/3628 385/136 |
| 7,433,556 B1 | 10/2008 | Popp |
| 8,983,246 B2 * | 3/2015 | Sasho .................. G02B 6/3604 385/26 |

FOREIGN PATENT DOCUMENTS

| | | |
|---|---|---|
| DE | 3688473 T2 | 9/1993 |
| DE | 20015959 U1 | 12/2000 |
| GB | 2247089 A | 2/1992 |
| IE | 102010004442 A1 | 7/2011 |
| JP | S59195608 A | 11/1984 |

\* cited by examiner

*Primary Examiner* — Chad Smith
(74) *Attorney, Agent, or Firm* — Laurence A. Greenberg; Werner H. Stemer; Ralph E. Locher

(57) ABSTRACT

A slip ring arrangement is simple to produce for contactless data transmission for high-frequency data signals, wherein two optical components are provided which are rotatable relative to one another about a common axis of rotation. The first optical component has a plurality of optical fibers which are disposed along at least one circular arc segment having a radius on a first end face. For this purpose the fibers are guided in a first carrier which has a coupling surface to which a first planar optical waveguide chip configured as a combiner is coupled.

20 Claims, 3 Drawing Sheets

OPTICAL SLIP RING ARRANGEMENT

CROSS-REFERENCE TO RELATED APPLICATION

This is a continuation application, under 35 U.S.C. §120, of copending international application No. PCT/EP2014/074082, filed Nov. 7, 2014, which designated the United States; this application also claims the priority, under 35 U.S.C. §119, of German patent application No. DE 10 2013 223 153.9, filed Nov. 13, 2013; the prior applications are herewith incorporated by reference in their entirety.

BACKGROUND OF THE INVENTION

Field of the Invention

The present invention relates to an optical slip ring arrangement.

Such an optical slip ring arrangement is described in U.S. Pat. No. 4,953,932. Such optical slip ring arrangements are used for the non-contact transmission of optical signals between two optical components which are rotatable with respect to one other. In particular, a data signal is transmitted via such an optical slip ring arrangement. The term "slip ring" is based on conventional mechanical slip rings and is misleading with regard to optical slip ring arrangements, insofar as in this case, the two optical components rotating relative to one another do not mechanically slip with respect to one another.

In the slip ring arrangement described in U.S. Pat. No. 4,953,932, a plurality of optical fibers are supported in each case on a type of perforated disk by their fiber ends, wherein the fiber ends are each directly adjacent to one another and lie on a circle. The center of the circle forms an axis of rotation of the components. The individual fibers are each connected to an optical rod having a comparatively large diameter, wherein the optical rod forms a mixer. On the output side, a plurality of optical fibers are again connected to the optical rod, and then run to a light sensor.

The production complexity for this is comparatively high. Due to the structure with the different fiber bundles, the optical slip ring arrangement is only somewhat suitable for the transmission of high-frequency data signals, for example, in the range of 10 GHz and greater. Such data signals have a relatively short wavelength, and differences in the optical path lengths in the various fibers result in path differences in the signal components, which may result in errors in the data evaluation.

German utility model DE 200 15 959 U1 describes an additional optical slip ring arrangement which allows multichannel transmission. For this purpose, a central optical waveguide bundle, and additionally, a coaxial ring made up of second optical waveguides, is arranged. The optical waveguides are formed by individual fibers which are supported within a coupling part and which emerge in each case from the coupling parts on the rear side.

SUMMARY OF THE INVENTION

On this basis, the object of the present invention is to provide an optical slip ring arrangement which demonstrates a structure which is simple in design and in particular is also suitable for the reliable transmission of high-frequency data signals.

This object is achieved according to the present invention via an optical slip ring arrangement. The optical slip ring is used for non-contact data transmission, in particular of high-frequency data signals in the GHz range, and preferably for the transmission of data signals higher than 10 GHz. During operation, such high-frequency data signals are therefore transmitted via the coupling point formed by this optical slip ring arrangement.

The optical slip ring arrangement has a first optical component and a second optical component, which are rotatable with respect to one another about a common axis of rotation. The first component has a first end face, and the second component has a second end face, which are arranged opposite one another. In this case, the two end faces are, for example, spaced apart from one another in the millimeter range, in particular in the range between 400 µm and 2000 µm.

The first component has a plurality of optical fibers which are routed in a carrier and which are arranged with their fiber ends at a first end face formed by the carrier along a circle or circular arc having a radius R. The center of the circle is formed by the axis of rotation. Multiple arc segments as well as a continuous circle may be formed by the fiber ends.

On the side opposite the end face, the carrier has a coupling face to which a planar optical waveguide chip is coupled. Thus, in this slip ring arrangement, the fibers in a carrier are not only supported and embedded in a defined manner on the end face, but also on the coupling face, wherein the carrier is simultaneously coupled at this coupling face to an optical waveguide chip.

Planar optical waveguide chips may be understood to be optical components in which an optical waveguide pattern is introduced into the surface of a carrier material. This is carried out via a special treatment of the carrier material, which is, for example, glass or a suitable transparent plastic. By structuring the carrier material, defined optical conducting paths are produced. In particular, the conductor track pattern in this case is produced via an ion diffusion process. The desired structuring of the conductor track pattern, i.e., the specification of the course of the individual conductor tracks, is established in this case, for example, via lithographic masking. In addition to the introduction of ions via the ion diffusion process, other methods for structuring the carrier material are also known, for example, via laser treatment.

Such planar optical waveguide components are in particular designed as splitters, in which multiple inputs or outputs are routed to a common output or input. This generally takes place via a conductor track pattern which is branched multiple times. Through the use of such an optical waveguide chip, the particular advantage is achieved that the plurality of the individual optical fibers are routed together to a common input or output in a single compact component, so that on the one hand, the handling and the construction during the production of the slip ring arrangement is comparatively simple overall. By providing the carrier in which the individual fibers on the coupling side are supported in a defined position, only the carrier and the optical waveguide chip must therefore be coupled to one another.

In addition, reliable high-frequency data transmission is also ensured via this embodiment. Temperature fluctuations in the surroundings, which, for example, may result in path differences and thus errors in the data evaluation when using fiber bundles or complex optical structures, for example, when using additional lens systems, etc., are at least significantly reduced via the use of the optical waveguide chip. Thus, temperature fluctuations affect all of the carrier material of the optical waveguide chip equally, so that all waveguide tracks on the optical waveguide chip experience the same relative change. Via the planar optical waveguide technology, a highly accurate technology is also provided, via which the individual optical waveguide tracks may be produced in a precise manner with regard to a preferably identical length during production.

Due to the planar technology, the coupling of the optical waveguide chip to the coupling face of the carrier requires that at least a portion, and preferably all, of the fibers which are arranged on the circular arc on the first end face, lie in at least a common connection plane on the coupling face. Preferably, all fibers which lie on this circular arc are routed into a common connection plane, so that they run along a single line. This line or connection plane then aligns with the surface of the optical waveguide chip into which the conductor track pattern is introduced.

Basically, the fiber ends on the coupling face may also be transferred into multiple, in particular into two, connection planes, and thus into multiple lines. In this case, preferably, multiple planar optical waveguide chips are then arranged, wherein one line aligns with a surface of an optical waveguide chip in each case. Basically, the possibility thus exists to connect at least one additional optical waveguide chip on the carrier and to distribute the plurality of the fibers across the optical waveguide chips.

In an expedient refinement, the optical waveguide chip is configured as a so-called combiner which has a first common output and a plurality of inputs, wherein the inputs are brought together via the integrated optical waveguide pattern to the first common output. In one preferred embodiment variant, in which only a single optical waveguide chip is arranged on the carrier, all fibers are brought together to this first common output in this case. An outgoing optical connection fiber is coupled to this output, via which the data signal is routed to a receiver. Basically, the reverse signal direction is also possible, so that in this case, the signal would be routed from a common input to the plurality of the outputs, and is coupled in from these outputs of the optical waveguide chip into the individual fibers of the carrier.

In a preferred embodiment, the optical slip ring arrangement is configured for a bidirectional arrangement. The plurality of the fibers arranged on the circular arc generally defines a first transmission channel, and in addition, another central fiber and/or a group of additional optical fibers is routed in the carrier, which terminate on the first front side. In the case of the central fiber, they terminate lying on the axis of rotation. In the case of a group of additional optical fibers, the fiber ends thereof terminate on the first front side on an additional circle or at least on a circular arc having a second radius. In this case, the second radius of the circle (circular arc) is different from the first radius of the optical fibers of the first transmission channel. Thus, a second transmission channel is defined via the central fiber or the additional optical fibers. Basically, more than two transmission channels may also be formed (central fiber, optical fibers, and additional group(s) of additional optical fibers).

The central fiber or the additional optical fibers of the additional transmission element channel is/are also expediently routed to the opposite coupling face and coupled to the at least one optical waveguide chip. The central fiber lies in particular in the same connection plane as the optical fibers of the first transmission channel.

In the case of multiple transmission channels, in particular in the case of an arrangement having fiber ends which are arranged on the first front side along two circles having different radii, the individual fibers of the different transmission channels are preferably each transferred into a common, channel-specific connection plane, and thus a common line on the coupling face. A separate optical waveguide chip is then assigned to each line, and thus to each transmission channel, in each case.

Expediently, the combiner is correspondingly configured to have a loop-through path which is associated with the central fiber. In this case, the loop-through path expediently extends from an input to an output without branching. Alternatively to the coupling of the central fiber to the optical waveguide chip, the possibility also exists for the central fiber itself to bypass the combiner in the manner of a bypass path.

According to a preferred first embodiment, the fiber ends of the optical fibers of each transmission channel are directly adjacent to one another on the first end face and form a circle. "Directly adjacent to one another" may be understood to mean that they have a maximum spacing from one another corresponding to their fiber diameter, preferably half their fiber diameter. The fiber diameter is typically in the range between 50 μm and 200 μm.

Due to the arrangement of the fiber ends adjacent to one other, it is ensured that a light cone emitted by the second end face of the second optical component overlaps one of the fiber ends to a sufficient degree.

Alternatively to the arrangement along a full circle, in a preferred embodiment, the fiber ends are arranged adjacent to one another in an approximately semicircular manner. "Semicircular" may be understood here to mean that the fiber ends run directly adjacent to one another along a semicircular arc and extend over an angular range of 180°+/−60°. In this case, they preferably extend over more than 180°, for example, over a range of 190° to 240°.

Alternatively, the possibility also exists to form multiple individual arc segments formed by individual fiber ends, which are spaced apart from one another and within which the individual fiber ends are each positioned directly adjacently to one another. In this case, the specific embodiment is based on the design of the second optical component. In the case of a full circle of the first end face formed by the fiber ends, an individual optical waveguide at the second end face of the second component is sufficient for reliable data transmission. If, for example, two opposite optical waveguides lying on a circle are arranged on the second end face, the semicircular arrangement at the first end face is sufficient.

By reducing the number of fibers in the first component, the overall production complexity is reduced. As a result, the susceptibility to errors due to production-related differences in the length of the individual optical waveguides is also reduced. Preferably, the fiber ends thus form only one arc segment, or multiple arc segments which are separated from one another, at the first end face, and are not arranged continuously along a circle.

In a preferred embodiment, the individual conductor tracks of each conductor pattern introduced into each planar optical waveguide chip are configured as so-called gradient-index waveguides. Gradient-index waveguides are characterized in that the index of refraction in the radial direction is not in steps, but rather runs continuously. Such gradient-index waveguides prevent or at least reduce propagation time differences of signals in the individual integrated waveguides of the optical waveguide chip. In particular, with the aid of such gradient-index waveguides, a dispersion of different modes in a multimodal transmission is at least reduced. This embodiment is of particular significance in particular in high-frequency data transmissions having high data rates, in order to ensure secure and reliable transmission.

In a preferred embodiment, the first optical component and the second optical component have an identical structure. As a result, a symmetrical structure on both sides of the optical, non-contact transmission path is achieved. Storage, construction, and the overall production are thereby kept economical.

In particular, the second optical component also has a carrier with fibers enclosed therein, which is connected to at least one planar optical waveguide chip. In this case, the carrier has a second front side which preferably has a fiber end pattern which is identical to the first front side. Alternatively, the fiber end patterns differ, for example, with regard to the number of fibers. It is important that each of the fibers of the individual transmission channels on both front sides lies at an equal radius with respect to the axis of rotation.

In order to keep the production complexity low, in a preferred embodiment, in the second optical component, only one or a few optical waveguides are formed, which terminate on the second end face, in particular separately and spaced apart from one another and lying on a circle. "A few optical waveguides" may be understood to mean preferably two optical waveguides and at most, for example, five to ten optical waveguides. In this case, the number of optical waveguides terminating at the second end face is also a function in particular of the specific embodiment of the second optical component. The number is preferably smaller than at the first end face of the first optical component. In this case, the two optical components are designed differently, among other things.

With regard to a two-channel or multi-channel transmission route, the second optical component also has a central optical waveguide, hereinafter referred to as a central conductor, which terminates at the second end face lying on the axis of rotation. The central conductor thus basically aligns with the central fiber of the first optical component. Alternatively or in addition, the second optical component also has at least one additional optical fiber or a group of optical fibers for an additional transmission channel, which is/are spaced apart from the central conductor below the second radius.

According to a first embodiment variant, the second optical element is configured as a second carrier having at least one fiber routed therein as an optical waveguide. In this case, this at least one fiber is spaced apart from the axis of rotation at a radius which corresponds to the radius of the circle or the circular arc, on which the fiber ends of the optical fibers of the first transmission channel are arranged on the first end face. Basically, the possibility also exists to distribute multiple optical fibers preferably distributed along a circle having this radius. Expediently, however, only one fiber is integrated into the carrier as an optical waveguide, spaced apart from the axis of rotation. In the case of the use of a multi-channel embodiment, at least one other additional fiber, for example, forming the central conductor, is expediently routed into the carrier.

In a preferred alternative embodiment, the second optical element includes at least a second planar optical waveguide chip which has at least one optical waveguide. This one also terminates at the second end face, spaced apart from the axis of rotation by the radius.

Expediently, exactly two optical waveguides terminate at the second front side, which are rotationally offset by approximately 180° and are thus spaced apart from one another by approximately twice the radius. In this case, the two optical waveguides are in particular integrated into the optical waveguide chip. Thus, two outputs are provided, which align with the fibers at the first end face, so that reliable data transmission is achieved. This makes it possible for the fibers simply to be arranged in a semicircle at the first end face.

For this purpose, the second optical waveguide chip is expediently configured as a 1×2 splitter. Similarly to a combiner, it has a common input which splits into multiple, namely, two, optical waveguides terminating at the second front side, wherein the ends of the optical waveguides lie on an imaginary circle about the axis of rotation having a radius R. At the second optical waveguide chip, an optical connecting fiber is expediently connected to the common input, which is then routed to a transceiver. Preferably, the second optical component is connected to a transmitter. Here as well, the reverse direction of transmission is also possible. In this case, the splitter would form a combiner.

In a particularly preferred embodiment, a third planar optical waveguide chip is arranged. The two optical waveguide chips face one another with their surfaces into which the conductor track pattern is integrated, and form the second optical component. In this case, the two optical waveguide chips are at most spaced slightly, for example, 0.5 to 1 mm, apart from one another. Preferably, they abut at their planar surfaces. This embodiment is based on the thought of providing a separate optical waveguide chip for the central conductor, in the multichannel embodiment having the central conductor. Due to the planar technology, in which all conductor tracks thus lie in a common plane, it would not be possible to connect the two waveguides on the outside to a common input and simultaneously also route the central conductor to a common connection side. This would require a crossing of conductor tracks.

Due to the design with the two optical waveguide chips, which are at least virtually adjacent on a connection plane and are supported with respect to one other in a defined manner, for example, glued to one another or mechanically connected to one another, a particularly efficient structure is thus achieved.

Other features which are considered as characteristic for the invention are set forth in the appended claims.

Although the invention is illustrated and described herein as embodied in an optical slip ring arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
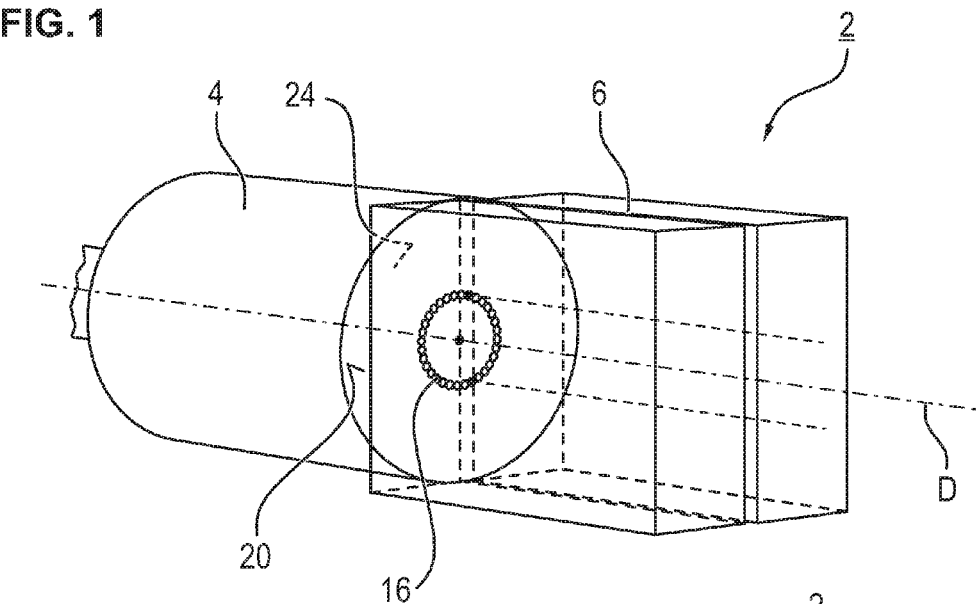
FIG. 1 is a perspective view of two optical components for forming an optical slip ring arrangement according to the invention.

In the figures, parts acting identically are provided with the same reference numerals.

Referring now to the figures of the drawings in detail and first, particularly to FIG. 1 thereof, there is shown an optical slip ring arrangement 2 includes a first optical component 4 and a second optical component 6, which are rotatable relative to one another about an axis of rotation D. For this purpose, the optical slip ring arrangement 2 has a mechanical housing which is not depicted in greater detail, in which the two components 4, 6 are arranged. In this case, the two components 4, 6 are integrated into two housing parts which are rotatably supported with respect to one another. One of the two components 4, 6 is preferably fixed, while the other is rotatable.

Figure 3:
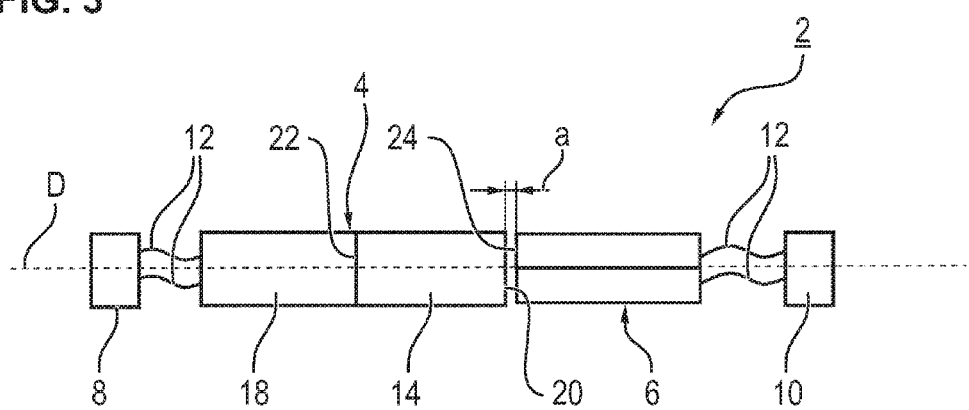
FIG. 3 is a highly simplified side view of an optical slip ring arrangement according to a first embodiment variant.
Figure 4:
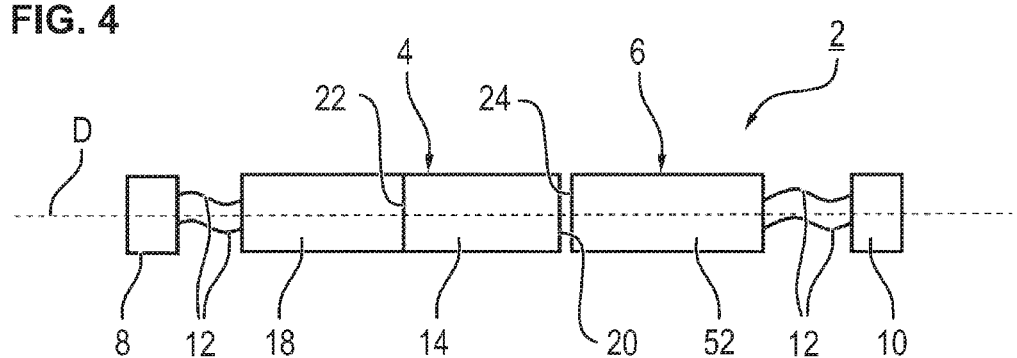
FIG. 4 is a highly simplified side view of an optical slip ring arrangement according to a second embodiment variant.

The two optical components 4, 6 are each connected to a first transmitting/evaluation unit and a second transmitting/evaluation unit, as is apparent in particular from FIGS. 3 and 4. Preferably, without loss of generality, the former is designed as an evaluation unit 8 and the latter as a transmitting unit 10. The optical components 4, 6 are preferably connected to these transmitting/evaluation units 8, 10 in each case via optical connecting fibers 12. The two optical components 4, 6 are spaced apart from one another at a gap a, which is in particular in the range of approximately 700 μm.

The two optical components 4, 6 are used for the noncontact optical data transmission of high-frequency data signals in the gigahertz range at signal frequencies preferably >1 GHz.

Such optical slip ring arrangements 2 are generally used in application areas in which the slip ring arrangement is subjected to rugged ambient conditions and environmental effects. For this purpose, a data signal to be transmitted is generally transmitted from the transmitting unit 10 to the second optical component 6, from which it is coupled across the gap a into the first optical component 4 with a rotational movement of the two components 4, 6. From the first component 4, the data signal is then conveyed to the evaluation unit 8.

The first component 4 is made up of a first carrier 14 having optical fibers 16 routed therein, and a first planar optical waveguide chip 18 which is configured as a combiner 18 in the exemplary embodiment. The first carrier 14 and the combiner 18 form a common structural unit and are preferably fixed directly to one another.

The first carrier 14 has a carrier material having channels or holes introduced therein, into which the optical fibers 16 are introduced. Preferably, the carrier 14 is generally made up of solid material and therefore has no hollow spaces, apart from the channels for the optical fibers 16. It extends from a front, first end face 20 to a rear coupling face 22 on the rear side. In the installed state, the first end face 20 is oriented opposite a second end face 24 of the second component 6 in a plane-parallel manner. In the exemplary embodiment, the optical fibers 16 are arranged running directly adjacent to one another along a circle having a radius R, so that their fiber ends on the first end face 20 form a closed circle in the exemplary embodiment.

Figure 2:
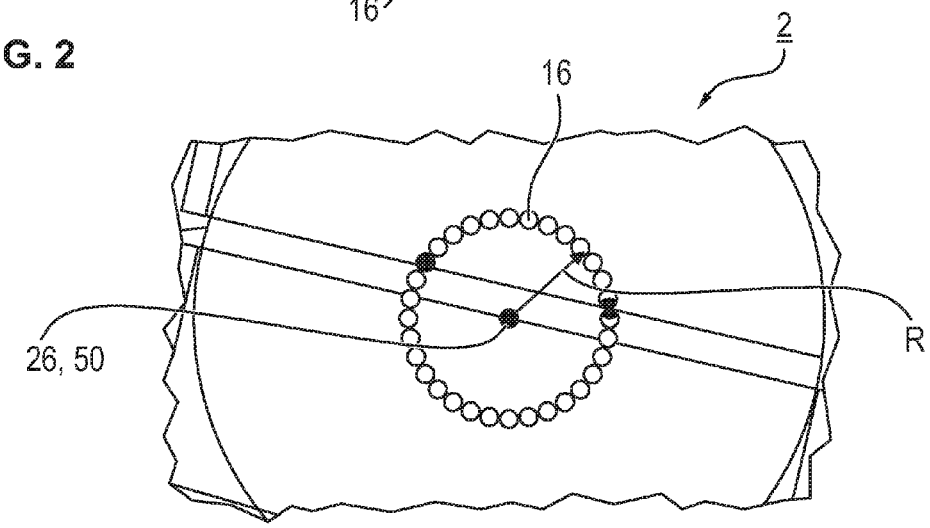
FIG. 2 is a top view onto a first end face of a first component, wherein in addition, a second end face of a second component is depicted.

Furthermore, a central fiber 26 is routed in the first carrier 14, which terminates at the first end face 20 lying on the axis of rotation D. FIG. 5B once again shows the fiber pattern of the optical fibers 16 and a central fiber 26 at the first end face 20, as also depicted in FIG. 2.

Figure 5A:
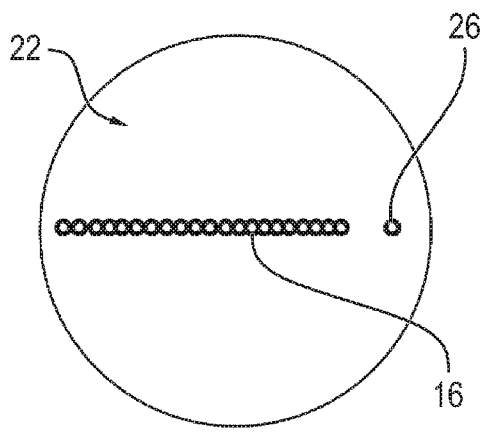
FIG. 5A is a view onto a coupling face of a carrier of the first optical component having a plurality of fibers lying in a connection plane.
Figure 6:
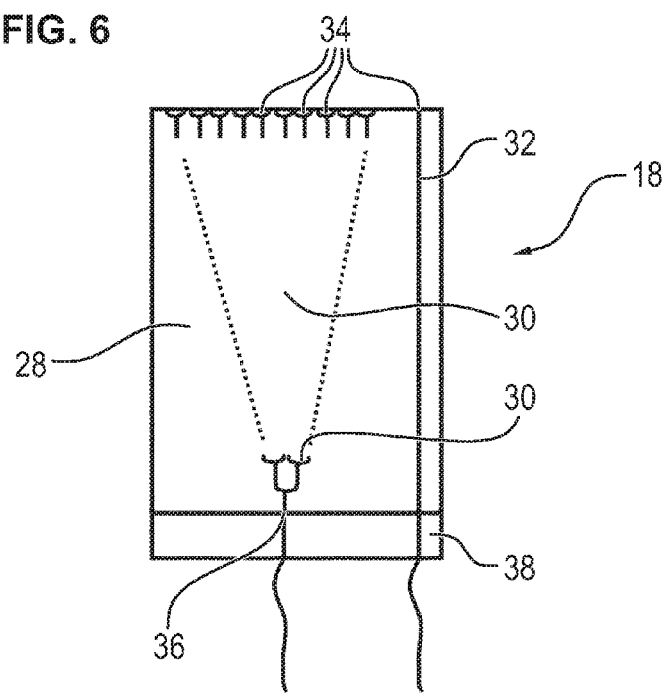
FIG. 6 is a top view onto a first optical waveguide chip of the first optical component having an integrated optical waveguide pattern.

These fibers 16, 26 are transferred into a common connection plane toward the coupling face 22, as depicted in FIG. 5A, so that they are arranged along a line. Finally, the first optical waveguide chip 18 is coupled at this coupling face 22. A top view onto the surface 28 thereof, into which a waveguide pattern 30 is introduced, is depicted in FIG. 6.

The combiner 18 has a plurality of inputs 34 on its end face oriented toward the coupling face 22, each aligning with the fibers 16 and the central fiber 26. In this case, a loop-through path 32 is formed for the central fiber 26, which runs without branches to an output front side, to which the connecting fibers 12 are connected. In the exemplary embodiment, all inputs 34 which align with the fibers 16 are brought together to a common output 36. For this purpose, a plurality of successive consecutive Y splitters is integrated into the waveguide pattern 30. The first optical waveguide chip 18 is generally formed as a 1×N combiner via the branched waveguide structure 30, where N is the number of optical fibers 16. In this case, N is preferably a multiple of 2. In the exemplary embodiment, a total of 32 fibers 16 are arranged in a circular manner on the first end face 20. Generally, multiple tens of fibers 16 are embedded in the carrier 14.

At the output front side, the combiner 18 has a connection carrier 38 in which the connecting fibers 12 are arranged and fixed and which align with the common output 36 or the end of the loop-through path 32. Here, the connecting fibers 12 lie, for example, in V-shaped notches which are introduced into the connection carrier 38 and are held in these notches by an embedding compound. The connection carrier 38 is connected as a whole to the remaining substrate of the planar combiner 18 via a suitable bonding method.

The combiner 18 in turn is likewise connected directly to the coupling face 22 of the first carrier 14 via a suitable bonding method.

Figure 7:
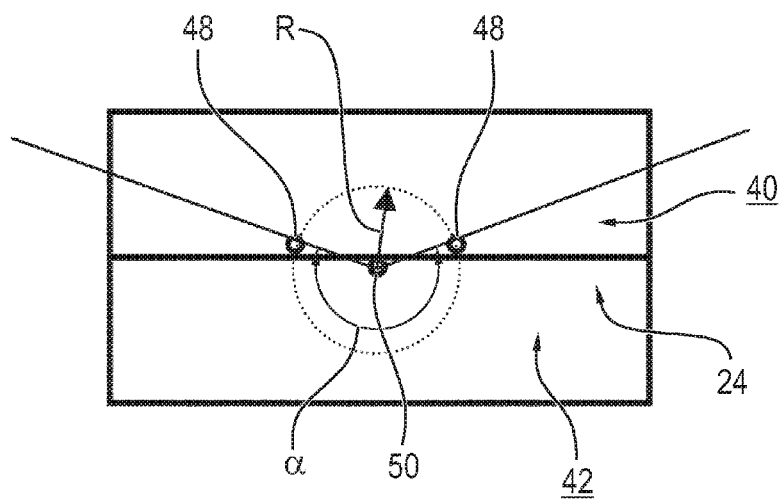
FIG. 7 is a view of the second end face of the second optical component of the first embodiment variant according to FIG. 3, in which the second optical component is formed by a second and third optical waveguide chip.

In the first embodiment variant depicted in FIG. 3, the second component 6 is formed by a second optical waveguide chip 40, which is configured in the exemplary embodiment as a splitter, and a third planar optical waveguide chip 42. The structure is also obtained in particular from FIGS. 7 to 9.

Figure 8:
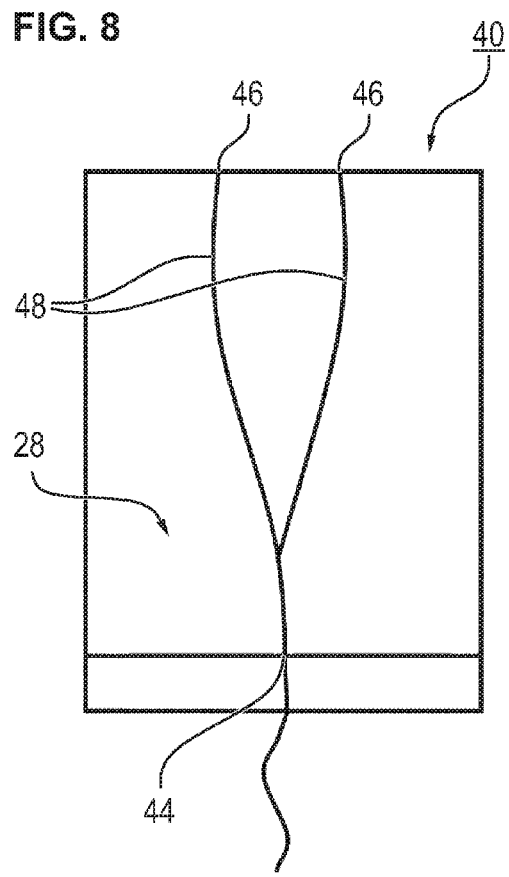
FIG. 8 is a top view onto a surface of the second optical waveguide chip provided with an optical waveguide pattern.
Figure 9:
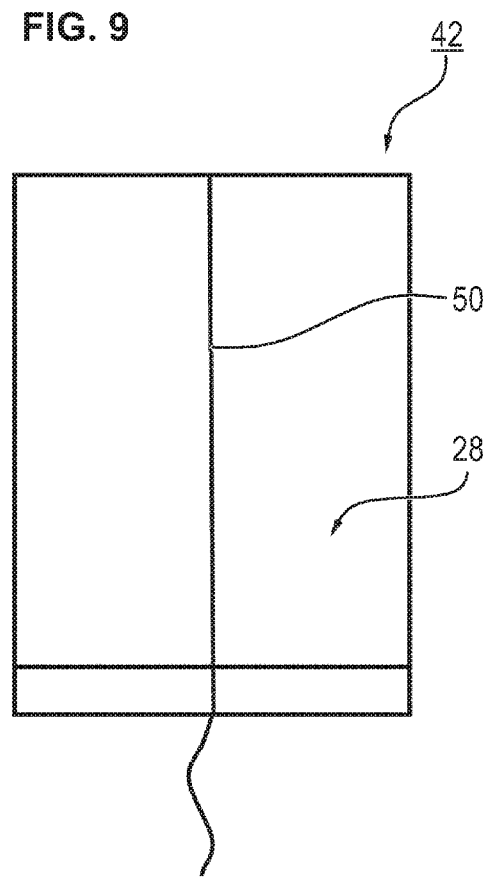
FIG. 9 is a top view onto the surface of the third optical waveguide chip provided with an optical waveguide pattern.

The two optical waveguide chips 40, 42 face one another on their outer sides 28, wherein the waveguide pattern 30 is formed on these outer sides 38 in each case. As depicted in FIG. 2, the two optical waveguide chips 40, 42 are spaced apart from one another at a gap. In this case, the gap dimension is at most one to three times the diameter of the fibers 16. As depicted in FIG. 8, here, the second optical waveguide chip 40 is designed as a 1×2 splitter which branches from a common input 44 to two outputs 46. Two optical waveguides 48 thus terminate on its output side on the second end face 24. The third optical waveguide chip 42 has only one continuous optical waveguide 48 without branches. On the rear end, both optical waveguide chips 40, 42 in turn include a connection carrier 38, via which the connecting fibers 12 are connected.

The two optical waveguide chips 40, 42 form a common structural unit having a separating plane which is formed slightly spaced apart from the axis of rotation D. In this case, the separating plane is in particular formed via an imaginary center plane lying in the gap between the two optical waveguide chips 40, 42.

The third optical waveguide chip 42 has a central conductor 50 as an optical waveguide, which terminates at the second end face 24 lying on the axis of rotation D. The central conductor 50 thus forms the second transmission channel, which is designed coaxially with respect to the axis of rotation D.

The two optical waveguides 48 of the second optical waveguide chip (splitter) 40 are spaced apart from one another by at least approximately twice the radius R. This results from the specific planar technology, according to which the optical waveguides 48, 50 are introduced into the surface 28. On the one hand, the arrangement of the two optical waveguide chips 40, 42 must be chosen in such a way that the axis of rotation D runs within the third optical waveguide chip 42; simultaneously, the optical waveguides 48 must be arranged on the surface in such a way that they lie on the circle about the axis of rotation D having a radius R (see FIG. 7).

The optical waveguide chips 18, 40, 42 are generally formed by an approximately cuboid substrate carrier which is formed from glass or a suitable plastic, for example, being made of PMMA. In this case, the waveguide pattern 30 is introduced into the surface 28 in each case via a suitable method, as results in each case with reference to FIGS. 6, 8, 9. Here, the carrier material is generally treated, so that it forms the optical waveguide pattern 30 in the desired areas. This is, for example, produced via an ion-diffusion process in a manner known per se. In this case, the individual waveguides of each waveguide pattern 30 are in particular designed as gradient-index waveguides. With the aid of this measure, propagation time differences in the individual waveguide sections from the inputs 34 to the common output 36 are preferably avoided, so that reliable and secure data transmission is ensured even in the case of high-frequency data transmissions.

Alternatively to the described embodiment variant of the second optical component 6 having the two waveguide chips 40, 42, the optical component 6 is designed similarly or identically to the first component 4. In particular, it has a carrier with fibers embedded therein, wherein at least one planar optical waveguide is connected on a coupling side of the second carrier 52. Here as well, it is in turn provided that the fiber ends arranged on a circle (circular arc) are transferred into a common connection plane.

Finally, yet a third embodiment variant is also possible, in which the second optical component is formed by the second carrier 52, in which optical fibers are supported and routed to the second end face 24 for forming a desired fiber end pattern. In this case, only one fiber is integrated into the second carrier 52 per transmission channel in the simplest case.

For data transmission, the first or the second optical component 4, 6 rotates optionally or in combination. With this rotational movement, the data signal over the one channel formed coaxially with respect to the axis of rotation D is easily transferred between the central conductor 50 and the central fiber 26. The two components 4, 6 are oriented with respect to the axis of rotation D, so that the central conductor 50 and the central fiber 26 thus align with one another.

For transmitting an additional data signal via an additional channel, the data signal fed in from the transmitting unit 10 is split via the splitter 40 into the two optical waveguides 48. Identical data signals are present at the outputs 46, only with reduced intensity. With the aid of the circle-shaped arrangement of the fibers 16, it is ensured that the optical signal are transmitted from the optical waveguides 48 into the fibers 16 at any rotational position and at any point in time. The prerequisite for this is that it is ensured at any rotational position that a particular light cone emitted by the optical waveguides 48 strikes the front side of an optical fiber 16 at least to a large extent. Due to the specific embodiment of the splitter in FIG. 8, the depicted arrangement of the fibers 16 in a completely continuous circle is not mandatory. Rather, an arrangement having a reduced number of optical fibers in comparison to the full circle is alternatively chosen, for example, a semicircular arrangement, wherein the fibers 16 then cover an angular range $\alpha$ (FIG. 7) of, for example, 200° to 230°, in order to ensure that at least one of the optical waveguides 48 aligns with an optical fiber 16 at any point in time.

In the second alternative specific embodiment depicted in FIG. 4, the second optical component 6 is configured as a second carrier 52, again having integrated optical fibers as an optical waveguide 48 or central conductor 50. The structure of the second carrier is thus basically identical to the first carrier 14, apart from the different number of fibers. Preferably, in this case, only one optical waveguide 48 formed, which is spaced apart from the axis of rotation by the radius R. A second fiber forming the central conductor 50 terminates at the second end face 24, coaxially to the axis of rotation D.

With respect to its optical components and apart from additional mechanical components, the optical slip ring arrangement 2 is made up of the optical components described with reference to FIG. 3 or 4. Additional optical components, for example, lenses, etc., are preferably not provided. Alternatively, one or both end faces 20, 24 is/are additionally populated with lenses, for example, in the form of macrolenses, microlenses, or GRIN lenses. Thus, the distance between the end faces 20, 24 is, for example, increased up to several centimeters. With the aid of this measure, for example, the susceptibility to malfunctions due to dust may be improved, should the impermeability of the mechanical protective housing cause problems.

Figure 5B:
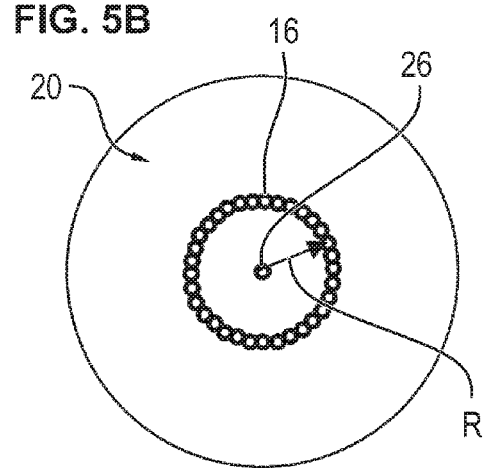
FIG. 5B is a view onto the first end face of the carrier of the first optical component.

Alternatively to the embodiment variant described here, the second optical component 6 is designed identically to the first optical component 4. In particular, it is thus also made up of a carrier 14 with a combiner 18 connected to it. In this case, a plurality of individual optical fibers 16 is integrated into the carrier 14, which form, for example, a circumferential circle at the second end face 24, as depicted in FIG. 5B, or also simply terminate in a semicircular manner at the second end face 24.

The following is a summary list of reference numerals and the corresponding structure used in the above description of the invention:

2—Optical slip ring arrangement
4—First optical component
6—Second optical component
8—Evaluation unit 10—Transmitting unit
12—Connecting fiber
14—First carrier
16—Optical fiber
18—Combiner
20—First end face
22—Coupling face
24—Second end face
26—Central fiber
28—Surface
30—Waveguide pattern
32—Loop-through path
34—Input
36—Common output
38—Connection carrier
40—Splitter
42—Third optical waveguide chip
44—Common input
46—Output
48—Optical waveguide
50—Central conductor
52—Second carrier

The invention claimed is:

1. An optical slip ring configuration for non-contact data transmission, comprising:
a first optical component having a first carrier, a first end face, and a rear coupling face;
a second optical component having a second end face, said first and second optical components being rotatable with respect to one another about a common axis of rotation, and for this purpose, are disposed opposite one another via said first end face and said second end face;
said first optical component further having a plurality of optical fibers with fiber ends disposed at said first end face along at least one arc segment having a radius, said optical fibers being routed in said first carrier extending from said first end face to said rear coupling face on a rear side, and on said first end face, said optical fibers are disposed running along a circular arc having a radius;
a first planar optical waveguide chip coupled to said rear coupling face and having inputs; and
at least three of said plurality of said optical fibers in said first carrier transferred from said first end face to said rear coupling face in at least one common connection plane such that at least three of said plurality of said optical fibers have fiber ends at said rear coupling face disposed along at least one line, and such that said inputs of said planar optical waveguide chip are optically coupled to said fiber ends at said rear coupling face.

2. The optical slip ring configuration according to claim 1, wherein said first planar optical waveguide chip is configured as a combiner having a first common output, wherein said plurality of said optical fibers are brought together to said first common output.

3. The optical slip ring configuration according to claim 1, further comprising at least one additional fiber routed in said first carrier which terminates at a first front side lying on the axis of rotation.

4. The optical slip ring configuration according to claim 3, wherein said at least one additional fiber is a central fiber routed to said rear coupling face and coupled to said first planar optical waveguide chip.

5. The optical slip ring configuration according to claim 4, wherein said first planar optical waveguide chip has a loop-through path which is associated with said central fiber.

6. The optical slip ring configuration according to claim 1, wherein said optical fibers have said fiber ends adjacent to one another at said first end face.

7. The optical slip ring configuration according to claim 1, wherein said optical fibers have said fiber ends disposed on said first end face adjacent to one another in a semicircular manner.

8. The optical slip ring configuration according to claim 1, further comprising an optical waveguide pattern with gradient-index waveguides being integrated into said first planar optical waveguide chip.

9. The optical slip ring configuration according to claim 1, wherein said second optical component has a structure which is identical to that of said first optical component.

10. The optical slip ring configuration according to claim 1, wherein said second optical component has at least one optical waveguide which is spaced apart from the axis of rotation by a radius at said second end face.

11. The optical slip ring configuration according to claim 1, wherein said second optical component has a central conductor which terminates at said second end face lying on the axis of rotation.

12. The optical slip ring configuration according to claim 1, wherein said second optical component is configured as a second carrier having at least one fiber routed therein as an optical waveguide.

13. The optical slip ring configuration according to claim 1, wherein said second optical component includes at least a second planar optical waveguide chip which has at least one optical waveguide.

14. The optical slip ring configuration according to claim 13, wherein said second planar optical waveguide chip is configured as a 1×2 splitter and has a common input which splits into two optical waveguides terminating at said second end face.

15. The optical slip ring configuration according to claim 14, wherein said second optical component has a third planar optical waveguide chip, said second and third planar optical waveguide chips each have a surface having an integrated optical waveguide pattern, said second and third planar optical waveguide chips form said second optical component with said surfaces facing one another.

16. The optical slip ring configuration according to claim 3, wherein said at least one additional fiber is a central fiber.

17. The optical slip ring configuration according to claim 1, further comprising an additional group of optical fibers which are disposed on a first front side along an additional circular arc.

18. The optical slip ring configuration according to claim 17, wherein said additional group of optical fibers are routed to said coupling face and coupled to said first planar optical waveguide chip.

19. The optical slip ring configuration according to claim 1, wherein said fiber ends, of said at least three of said plurality of optical fibers, which are at said first end face, are disposed along said at least one arc segment.

20. The optical slip ring configuration according to claim 1, wherein all of said plurality of optical fibers with fiber ends are disposed at said first end face along said at least one arc segment having a radius.

* * * * *